United States Patent [19]
Kotani et al.

[11] Patent Number: 5,323,246
[45] Date of Patent: Jun. 21, 1994

[54] FACSIMILE APPARATUS CONTROLLED BY DTMF SIGNALS

[75] Inventors: Matahira Kotani, Ikoma; Motohiko Hayashi, Yamato-Koriyama, both of Japan

[73] Assignee: Sharp Kabushiki Kaisha, Abeno, Japan

[21] Appl. No.: 880,829

[22] Filed: May 11, 1992

[30] Foreign Application Priority Data

May 14, 1991 [JP] Japan .................................. 3-109303

[51] Int. Cl.⁵ ............................................ H04M 1/50
[52] U.S. Cl. ..................................... 358/434; 358/437
[58] Field of Search ................... 358/434-439

[56] References Cited
U.S. PATENT DOCUMENTS

4,313,038  1/1982  Nilssen et al. ................ 179/84 VF

FOREIGN PATENT DOCUMENTS

0305117A2  8/1988  European Pat. Off. .
2654279    5/1991  France .
63-217859  9/1988  Japan .
2-94743    4/1990  Japan .
2213681    8/1989  United Kingdom .

*Primary Examiner*—Stephen Brinich
*Attorney, Agent, or Firm*—David G. Conlin; Robert F. O'Connell

[57] ABSTRACT

Disclosed a facsimile apparatus that combines copying with transmission. An external telephone is connected to it to be remotely controlled by a remote signal including at least one DTMF signal from the external telephone. And, there is provided means for comparing the tone duration of the tone-pair signal having DTMF frequencies sent by the external telephone with a predetermined detection time, and deciding whether or not said tone-pair signal is a valid DTMF signal used for remote signals based on the compared result. Further, there is provided means for estimating the tone duration of DTMF signals that is specific to the external telephone, and setting the optimum detection time.

5 Claims, 4 Drawing Sheets

FACSIMILE APPARATUS CONTROLLED BY DTMF SIGNALS

BACKGROUND OF THE INVENTION

1. Field of the Invention

The present invention relates generally to facsimile apparatus, and, more particularly, to a facsimile apparatus which can be operated by DTMF (dual tone multi-frequency) signals from an external telephone.

2. Description of the Related Art

Facsimile apparatus or facsimile machines combine copying with transmission. They routinely send and receive facsimile signals over the telephone network, increasing the uses of the telephone systems besides sending and receiving voice signals of the conversations by ordinary telephone sets. The amount of information that can be handled by facsimile apparatus is huge. Therefore, facsimile apparatus have enjoyed tremendous acceptance and growth in homes and businesses.

An external telephone is usually arranged to be connected to the facsimile apparatus so that either one is available on the common telephone line. When the external telephone uses the telephone line for conversation, the facsimile apparatus is sometimes wanted to be connected to the telephone line for the purpose of sending or receiving facsimile images. At that time, operation of switching over to the facsimile apparatus from the external telephone is needed.

Now, there is a type of facsimile apparatus that is remotely operated by the combinations of DTMF signals (numbers 0 through 9 and symbols # and *) sent from the external telephone which is the Touch-Tone telephone having a push-button keypad. That is, the tone-pair signal frequencies sent from the external telephone are tested in the facsimile apparatus mentioned above to determine if they are DTMF frequencies. Then, the tone durations is measured to determine if the tone-pair signal is present at least for a predetermined detection time. The tone-pair signal that accomplishes the timing requirement is recognized as a valid DTMF signal used for the remote operation. The combination of valid DTMF signals may indicate the type of remote operations.

In the facsimile apparatus mentioned above, the remote operation by DTMF signals is performed after the signals have accomplished filtering and timing requirements. Therefore, the remote operation by talk-off, that is the detection of speech segments or other sounds as a real DTMF signal, is effectively prevented.

However, since the tone duration of the DTMF signal is tested on the basis of a predetermined fixed detection time, the facsimile apparatus has the following disadvantages.

That is, as for the electronic telephones which can send DTMF signals, there are provided some models having operating parameters wherein tone durations of DTMF signals generated are 50 ms. 80 ms and 120 ms varying according to the models. And there is still a model in which a DTMF signal is generated while a key of the push-button keypad is pressed. Therefore, the facsimile apparatus having the electronic telephone used as the external telephone may receive DTMF signals having a different tone duration peculiar to the model.

At the beginning of the connection of an external telephone to the facsimile apparatus, it is needed to set the detection time at the minimum time, that is 50 ms (actually a little bit shorter time, say 45 ms), as the detection time, so that every electronic telephone is available as the external telephone for the purpose of remote operations. However, when a external telephone having operating parameters wherein the tone duration of DTMF signals is for example 120 ms, is connected to the facsimile apparatus, there exists a higher probability that the DTMF signal is erroneously recognized compared to the case where the detection time is set at 120 ms (actually a little bit shorter time). Therefore, at the time of erroneous recognision of the signal and erroneous operation in the known facsimile apparatus, it is necessary to reset the dectection time in the range where the facsimile apparatus is allowed to be remotely operated and in the optimum condition adapted to the operating parameters of the external telephone.

As mentioned above, the known facsimile apparatus are arranged to recognize DTMF signals in light of the frequencies and the detection time for preventing the erroneous identification of the DTMF signal. However, the facsimile has disadvantages in that it is inconvenient for the user to manually set the detection time that is optimized to the tone duration of DTMF signals as one of the operating parameters of the external telephone.

SUMMARY OF THE INVENTION

It is, therefore, an object of the present invention to provide a facsimile apparatus which is capable of automatically setting the optimum detection time to sense the tone duration of the DTMF signal peculiar to the external telephone connected to it.

The object of the invention can be achieved by a facsimile apparatus comprising: means for comparing the tone duration of the tone-pair signal having DTMF frequencies sent by the external telephone with a predetermined detection time, and deciding whether or not said tone-pair signal is a valid DTMF signal used for remote signals based on the compared result; and means for estimating the tone duration of DTMF signals that is specific to the external telephone, and setting the optimum detection time.

Further objects and advantages of the present invention will be apparent from the following description of the preferred embodiments of the invention as illustrated in the accompanying drawings.

DESCRIPTION OF THE PREFERRED EMBODIMENTS

An embodiment of the present invention will be described with reference to FIG. 1 through FIG. 4.

Figure 1:
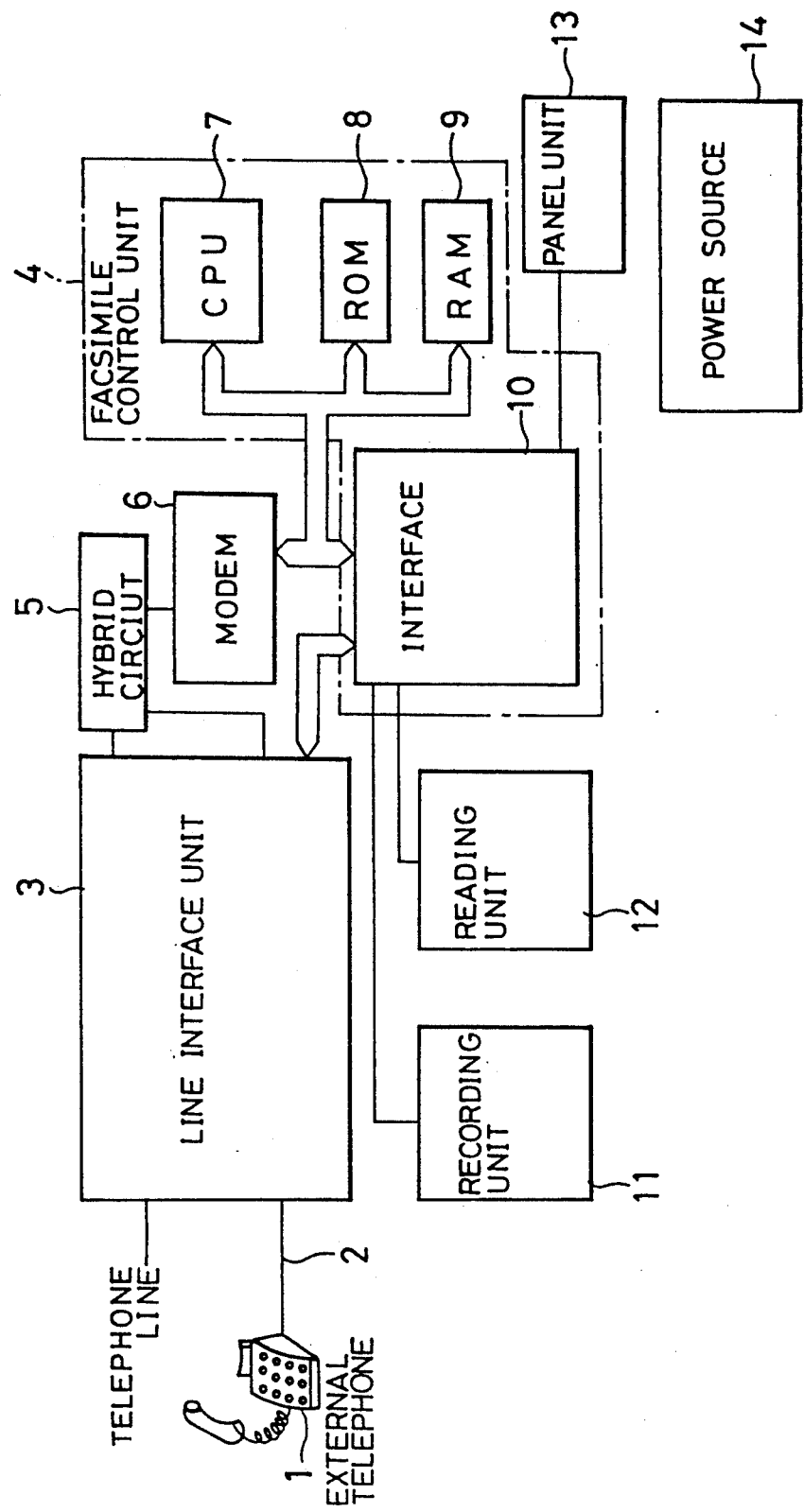
FIG. 1 is a block diagram of a facsimile apparatus in accordance with an embodiment of the present invention.

A facsimile apparatus according to the embodiment, as shown in FIG. 1, serves to recognize DTMF signals sent from an external push-button telephone or touch-tone telephone 1 as remote signals, so that the facsimile apparatus can be remotely operated by the remote signals. According to the operating parameters of the external telephone 1, the tone duration of the DTMF signal is set at 50 ms, 80 ms or 120 ms, or it continues while a key of the push-button keypad is being pressed.

The DTMF signal consists of two frequency tones in combination for identifying 12 keys which represent the numbers 0 through 9 and the symbols # (pound sign) and * (asterisk). For example, pressing key "5" of the push-button keypad generates a 770 Hz tone and a 1,336 Hz tone, and pressing key "*" generates a 941 Hz tone and a 1,209 Hz tone.

Figure 2:
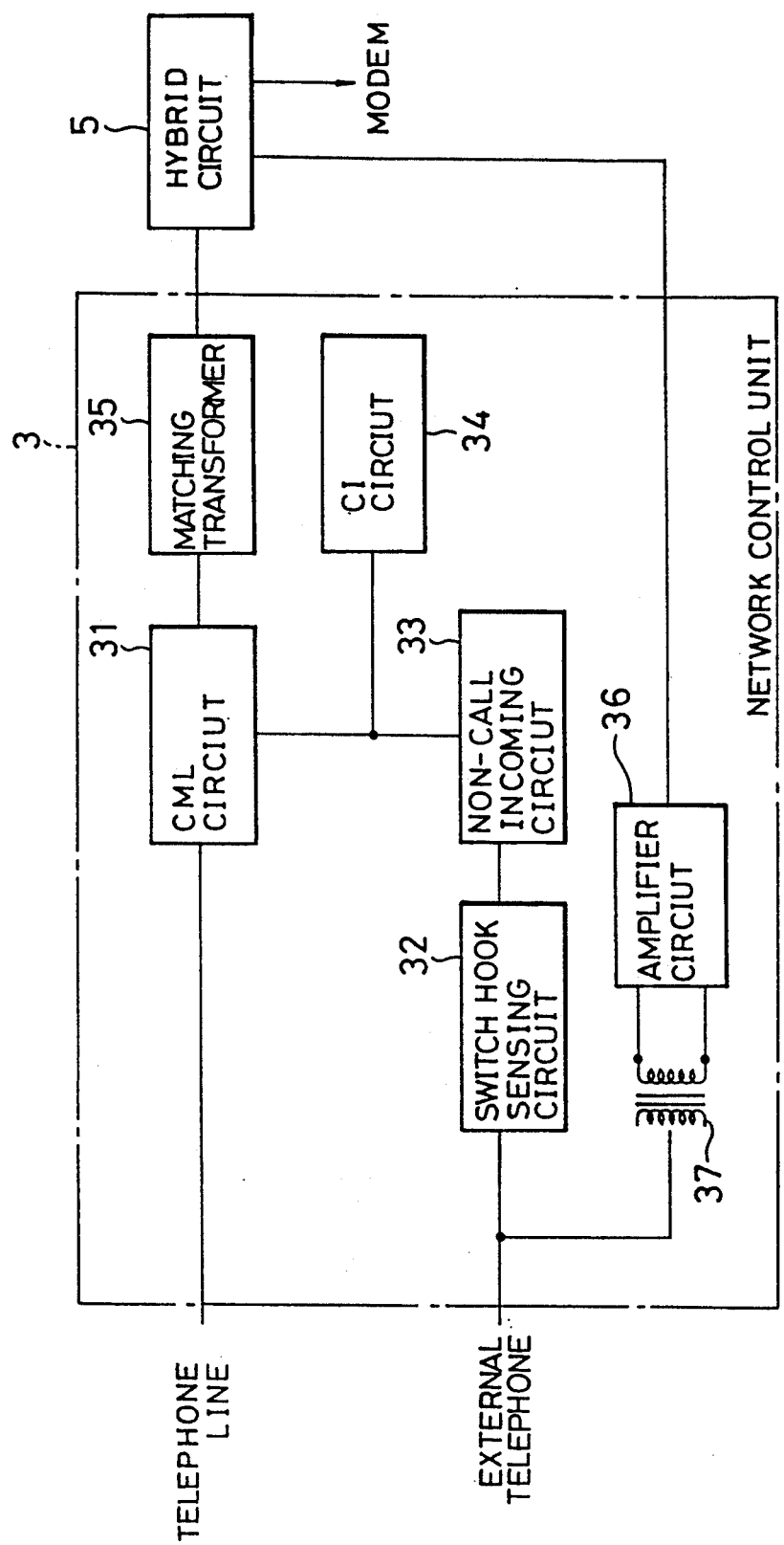
FIG. 2 is a block diagram of a line interface unit included in the facsimile apparatus shown in FIG. 1.

As shown in FIG. 1, the external telephone 1 is connected to one terminal of a line interface unit 3 through a wire 2, and the telephone line is connected to the other terminal of the line interface unit 3. Therefore, the line interface unit 3 is arranged to receive the voice signal and the DTMF signal from the external telephone 1 and a remotely located telephone (not shown). The line interface unit 3 includes a switchhook sensing circuit 32 connected to the external telephone 1 as shown in FIG. 2. The switchhook sensing circuit 32 serves to sense whether or not the handset of the external telephone 1 is lifted. The switchhook sensing circuit 32 in turn is connected to a CI (Call Identification) circuit 34 through a non-call incoming circuit 33.

The switchhook sensing circuit 32 is also connected to a CML (Connecting Modem to Line) circuit through the non-call incoming circuit 33. The CML circuit is connected to the remotely-located telephone through the telephone line. The CML circuit 31 serves to switch the connection from the external telephone 1 to the facsimile apparatus and vice versa in response to the switching signal sent from a facsimile control unit 4 (see FIG. 1).

A matching transformer 35 is connected to the facsimile apparatus side of the CML circuit 31. This matching transformer 35 in turn is connected to a hybrid circuit 5. The external telephone 1 is also connected to an amplifier circuit 36 through an transformer 37. The amplifier circuit 36 in turn is connected to the hybrid circuit 5. Therefore, the signal generated by the external telephone 1 is directly input to the hybrid circuit 5. And, the facsimile signal is input to the hybrid circuit 5 through the matching transformer 35, only after the telephone line is switched over to the facsimile side by the CML circuit 31.

The hybrid circuit 5 mentioned above in turn is connected to a modem 6 having an output terminal for the DTMF signal. The modem 6 serves to determine whether or not the signal sent from the external telephone 1 is a DTMF signal. When a DTMF signal is recognized, the output terminal of the modem 6 for the DTMF signal produces high voltage. The modem 6 in turn is connected to a facsimile control unit 4 (see FIG. 1). The high voltage of the output terminal of the modem 6 for the DTMF signal is detected by the facsimile control unit 4.

The facsimile control unit 4 is arranged to have a CPU (Central Processing Unit) 7, a ROM (Read Only Memory) 8, a RAM (Ramdom Access Memory, preferably a battery backup RAM) 9 and an interface 10. The CPU 7, the ROM 8, the RAM 9, and the interface 10 are connected to the modem 6 through the data bus and the address bus.

The CPU 7 serves to control the interpretation and execution of the program instructions on the basis of the program stored in the ROM 8. The program contains a routine for sensing the DTMF signal. The RAM 9 contains a memory area for the detection time and another memory area for temporarily storing the data given on the way of arithmetic and logical operations. Those areas are used together with the CPU 7 to recognize the DTMF signal and set the detection time in the routine for sensing the DTMF signal used for the remote operation.

The interface 10, which constitutes the facsimile control unit 4 together with the CPU 7, contains a gate array, for example. The interface 10 is connected to a recording unit 11, a reading unit 12, and a panel unit 13 for inputting telephone numbers and others. The interface 10 operates for interfacing the CPU 7, and for controlling motors (not shown), the recording unit 11, the reading unit 12, the panel unit 13, the modem 6 and the line interface unit 3.

The recording unit 11 is arranged to have, for example, a roll of thermal paper, a thermal print head for forming an image replica on the paper, and a paper sensor for sensing the size of paper, and is controlled by the facsimile control unit 4. The reading unit 12 has an optical system or scanner such as a CCD (Charge Coupled Device), etc. for reading the image of a subject copy, and a motor for moving the subject copy. Like the recording unit 11, the reading unit 12 is also controlled by the facsimile control unit 4. The recording unit 11 and the reading unit 12 are connected to a power source 14 through driver circuits (not shown). The power source 14 is arranged to supply a stable electric power to the components described above.

Now, the description will be directed to the remote operation of the facsimile apparatus by the external telephone 1.

When a remotely-located telephone signals through the telephone line, the handset of the external telephone 1 is lifted off-hook, so that the connection between the external telephone 1 and the calling telephone is made. And when the connection state is wanted to be switched to the facsimile side from the external telephone 1 during the speech, keys of the external telephone 1 are pressed, and the switching is established by the remote operation.

Figure 3:
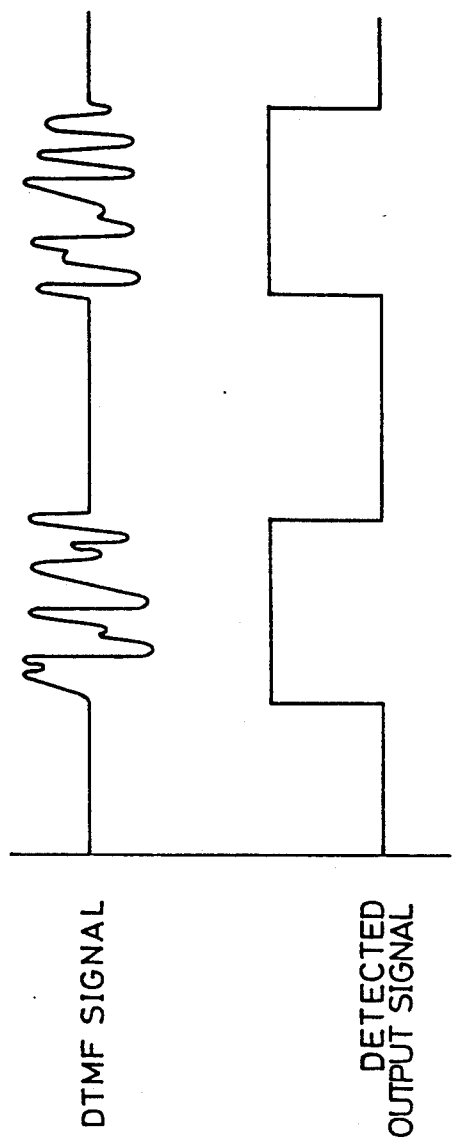
FIG. 3 is a timing chart of DTMF signals and a detected output signals.
Figure 4:
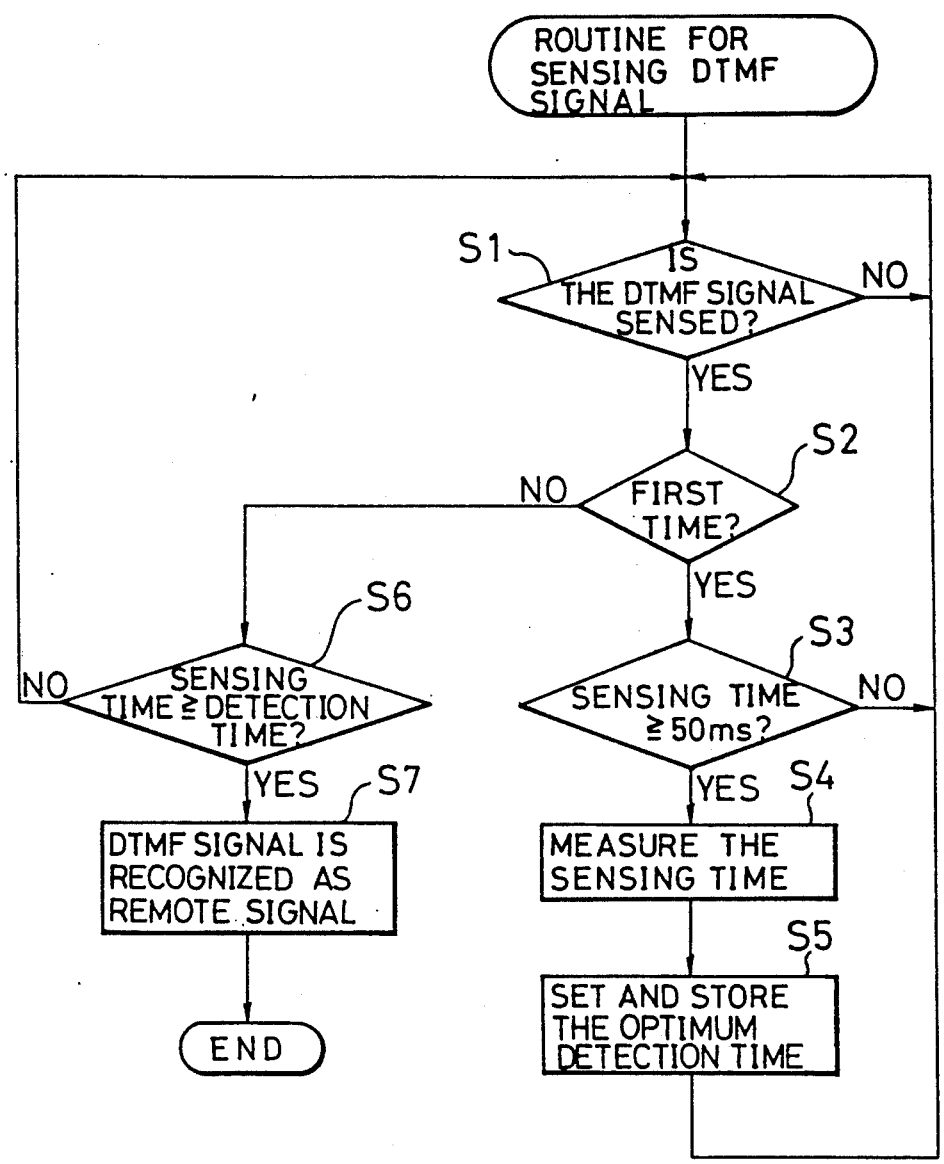
FIG. 4 is a flowchart showing a routine for sensing the DTMF signal.

Assume that the combination of the DTMF signals is "5" and "*" of the switching operation mentioned above, keys "5" and "*" of the push button keypad are pressed in sequence. The external telephone 1 generates a DTMF signal for "5" composed of 770 Hz tone and 1336 Hz tone, and a DTMF signal for "*" composed of 941 Hz tone and 1209 Hz tone for a certain period of time as shown in FIG. 3.

Both of the DTMF signals are input to the amplifier circuit 36 through the transformer 37 (see FIG. 2). After the signals are amplified in the amplifier 36, the amplified signals are input to the modem 6 through the hybrid circuit 5. The modem 6 detects the input DTMF signals as shown in FIG. 3 and outputs the detected output signals (see FIG. 3) that is high voltage from the output terminal for the DTMF signal to the facsimile control unit 4 (see FIG. 1) during the period.

When the detected output signal is input to the facsimile control unit 4, the signal is actually input to the CPU 7 through the interface unit 10. The CPU 7 executes the routine for sensing the DTMF signal according to the procedure shown in FIG. 4. As mentioned above, the routine is stored in the ROM 8. The routine is designed to determine whether or not the signals input through the interface unit 10 are the detected output signals from the output terminal for the DTMF signal in the modem 6 (step S1) for the purpose of sensing the DTMF signal. If the DTMF signal is not sensed, the process at the step S1 is repeated until the DTMF signal is sensed.

If the DTMF signal is sensed at the step S1, the process goes to a step S2 at which it is determined whether or not the sensed DTMF signal is a first-time input (step S2). If the signal is the first-time one, the process goes to a step S3. At the step S3, it is determined whether or not the time for sensing the DTMF signal is 50 ms or more. If it is less than 50 ms, it is determined that the sensed DTMF signal is not the signal output from the external telephone 1. Then, the process at the step S1 is repeated (step S3).

On the other hand, if the sensing time or tone duration of the DTMF signal is at least 50 ms, the time is measured. That is, the tone duration of the DTMF signal of the external telephone 1 is measured (step S4). Then, since the measured sensing time specifies the operating parameter specific to the external telephone 1, the optimum detection time for sensing the tone duration of the DTMF signal is stored in the memory area in the RAM 9 (step S5). It is preferable to set upper limit for the detection time stored.

If it is determined that the DTMF signal is a second-time or later-time one at the step S2, "NO" is determined. Then, the process at the step S6 is executed. At the step S6, the sensing time of the DTMF signal is compared with the detection time stored in the memory area. If it is determined that the sensing time or tone duration is less than the detection time, it is determined that the DTMF signal is not the signal output from the external telephone 1 having the operating parameter specified by the first DTMF signal and the process at the step S1 is executed (step S6). If, on the other hand, the sensing time is at least the detection time, "YES" is given and the process at the step S7 will be executed. At the step S7, the input DTMF signal is recognized as a remote signal (step S7).

As set forth above, the facsimile apparatus according to this embodiment is capable of measuring the sensing time or tone duration of the DTMF signal output from the external telephone 1 and specifying the operating parameter of the external telephone 1 in light of the measured time for automatically setting the optimum detection time to test the tone duration of the DTMF signal output from the external telephone 1. Hence, the facsimile apparatus is not needed to manually set the detection time that is optized to the operating parameter peculiar to the external telephone 1. This results in making the handling of the facsimile apparatus more easy.

The facsimile apparatus according to this embodiment is arranged to specify the operating parameter of the external telephone in light of the DTMF signal output from the external telephone 1 for the first time. Without being limited to it, however, it may be possible to treat as the first DTMF signal the DTMF signal sent from the external telephone 1 when a specific key provided in the facsimile apparatus, especially in the panel unit 13 is pressed. Also, the initializing key is provided in the facsimile apparatus, especially in the panel unit 13 to reset or initializing the detection time stored in the memory area at the minimum value.

Many widely different embodiments of the present invention may be constructed without departing from the spirit and scope of the present invention. It should be understood that the present invention is not limited to the specification, except as defined in the appended claims.

What is claimed is:

1. A facsimile apparatus that combines copying with transmission and further has an external telephone connected to it to be remotely controlled by a remote signal including at least one DTMF signal consisting of two frequency tones in combination sent from the external telephone, the facsimile apparatus comprising:
    memory means;
    means for comparing a tone duration of a tone-pair signal having DTMT frequencies sent from the external telephone with a predetermined detection time stored in the memory means, and deciding whether or not the tone-pair signal is a valid DTMF signal, that is used for the remote signal, based on the compared result; and
    means for estimating the tone duration of a DTMF signal that is specific to the external telephone, and setting the estimated tone duration as the optimum detection time to be stored in the memory means.

2. A facsimile apparatus according to claim 1, wherein line interface means are provided for switching from the external telephone to the facsimile apparatus, and vice versa.

3. A facsimile apparatus according to claim 2, wherein said line interface means includes switch-hook sensing means for indicating the active state of the external telephone circuit.

4. A facsimile apparatus that combines copying with transmission and further has an external telephone connected to it to be remotely controlled by a remote signal including at least one DTMF signal consisting of two frequency tones in combination sent from the external telephone, the facsimile apparatus comprising:
    memory means prepared in a facsimile control unit;
    means for comparing a tone duration of a tone-pair signal having DTMF frequencies sent by the external telephone and detected in a modem with a predetermined detection time stored in the memory means, and deciding whether or not the tone-pair signal is a valid DTMF signal sent from the external telephone and used for the remote signal, based on the compared result; and
    means for estimating the tone duration of a DTMF signal that is specific to the external telephone, and writing the estimated tone duration into the memory means as the optimum detection time when the estimated tone duration has been longer than the predetermined time stored in the memory means.

5. A facsimile apparatus that combines coping with transmission and further has an external telephone connected to it to be remotely controlled by a remote signal including at least one DTMF signal consisting of two frequency tones in combination sent from the external telephone, the facsimile apparatus comprising:
    memory means;
    means for comparing a tone duration of a tone-pair signal having DTMF frequencies sent from the external telephone with a predetermined detection time stored in the memory means, and deciding whether or not the tone-pair signal is a valid DTMF signal, that is used for the remote signal, based on the compared result;
    means for estimating the tone duration of a DTMF signal that is specific to the external telephone, and setting the estimated tone duration as the optimum detection time to be stored in the memory; and
    means for initializing the detection time stored in the memory means.

* * * * *